United States Patent Office 3,498,379
Patented Mar. 3, 1970

3,498,379
FLOODING METHOD FOR RECOVERING PETROLEUM EMPLOYING AQUEOUS SOLUTION OF HYDROCARBON SULFONATE
Charles L. Murphy, Dallas, Tex., assignor to Mobil Oil Corporation, a corporation of New York
No Drawing. Filed Aug. 28, 1968, Ser. No. 755,799
Int. Cl. E21b 43/22
U.S. Cl. 166—275         8 Claims

ABSTRACT OF THE DISCLOSURE

This specification discloses a method for recovering petroleum from a petroliferous subterranean formation by passage through the formation of an aqueous solution of a hydrocarbon sulfonate. The aqueous solution contains 2-20 percent by weight of sodium carbonate, sodium tripolyphosphate, tetrasodium pyrophosphate, or sodium borate. Further, the aqueous solution must contain not more than 0.5 percent by weight of sodium chloride.

BACKGROUND OF THE INVENTION

It has theretofore been proposed to recover petroleum from a petroliferous subterranean formation by a flooding method. In this type of method, a fluid is injected into the formation through at least one injection well and passed through the formation in the direction of at least one production well. The fluid displaces the petroleum from within the formation and moves it through the formation in the direction of at least one production well through which it can be brought to the surface of the earth. Commonly, water is employed as the displacing, or flooding, fluid. To assist in displacing the petroleum from the formation, various materials are added to at least a portion of the water. For example, a surfactant such as a hydrocarbon sulfonate is added to the water and the use of an aqueous solution of hydrocarbon sulfonate is disclosed in U.S. Patents Nos. 3,302,713 and 3,348,611. The hydrocarbon sulfonate effects a low interfacial tension between the aqueous solution thereof and the petroleum in the formation. As a result of this low interfacial tension, displacement of the oil from the formation is facilitated.

It has also been recognized that the presence of salts, such as sodium chloride, and ionizable sulfates, such as sodium sulfate, in the aqueous solution of hydrocarbon sulfonate, effects a further decrease in the interfacial tension between the aqueous solution and tht petroleum in the formation. Thus, the above-mentioned U.S. Patent No. 3,302,713 discloses that sodium chloride in concentrations between 0.5 and 5 percent by weight is effective to reduce further the interfacial tension. However, the patent also discloses that salt concentrations in excess of about 10 percent become detrimental since they tend to "salt-out" the petroleum sulfonate, thereby considerably reducing the effective concentration of the hydrocarbon sulfonate at the flood front. U.S. Patent No. 3,373,808 discloses the addition of 0.1 to 10 percent by weight of an ionizable sulfate compound such as sodium sulfate to a solution of hydrocarbon sulfonate to effect a lowering in interfacial tension between the solution and petroleum in a subterranean formation.

It is also known to employ sodium carbonate, sodium tripolyphosphate, tetrasodium pyrophosphate, or sodium borate in an aqueous solution of hydrocrabon sulfonate for recovering petroleum from a petroliferous subterranean formation. Thus, in copending applications Ser. Nos. 673,686 and 673,685, filed Oct. 9, 1967 by Peggy M. Dunlap and William R. Foster, and by Billy G. Hurd and William R. Foster, respectively, the use of such compounds in an aqueous solution of hydrocarbon sulfate is disclosed In copending application Ser. No. 673,686, sodium carbonate, sodium tripolyphosphate and tetrasodium pyrophosphate are disclosed to effect an enhanced lowering of interfacial tension. However, these materials, as disclosed in this copending application, are employed in the aqueous solution of hydrocarbon sulfonate along with sodium chloride. Further, they are employed in concentrations not greater than 0.5 percent by weight of the aqueous solution of hydrocarbon sulfonate. In copending application Ser. No. 673,685, sodium carbonate, sodium tripolyphosphate, tetrasodium pyrophosphate, and sodium borate are disclosed for the purpose of reducing the adsorption of the hydrocarbon sulfonate from the solution thereof onto the surfaces of the subterranean formation. Further, these compounds are employed in concentrations not greater than 0.2 percent by weight of the solution of hydrocarbon sulfonate.

In the use of sodium chloride with sodium carbonate, sodium tripolyphosphate and tetrasodium pyrophosphate, and in the use of sodium sulfate, for reducing the interfacial tension between an aqueous solution of hydrocarbon sulfonate and petroleum in a subterranean formation as heretofore practiced, the specific concentrations of the compounds or compound in the aqueous solutions have been selected to give a maximum reduction in the interfacial tension. Thus, it has been the practice to determine, by laboratory test, the concentration of the compounds or compound selected to be employed that will give a minimum interfacial tension between the aqueous solution of the particular hydrocarbon sulfonate to be employed and a sample of the oil from the subterranean formation. Having determined the concentration of the compounds or compound giving the minimum interfacial tension, this concentration is employed in the aqueous solution of hydrocarbon sulfonate injected into the subterranean formation.

SUMMARY OF THE INVENTION

In accordance with the invention, to an aqueous solution of hydrocarbon sulfonate there is added sodium carbonate, sodium tripolyphosphate, tetrasodium pyrophosphate, or sodium borate in a concentration at least as great as 2 percent by weight of the solution, the solution containing no more than 0.5 percent by weight of sodium chloride and this solution is injected into a petroliferous subterranean formation through an injection well leading to the formation to displace the petroleum in the formation in the direction of a production well leading from the formation from which the petroleum may be brought to the surface of the earth.

DESCRIPTION OF SPECIFIC EMBODIMENTS

My invention is based upon my discovery that sodium carbonate, sodium tripolyphosphate, tetrasodium pyrophosphate, and sodium borate will effect a lowering of interfacial tension, and give a minimum interfacial tension, over a broader range of concentrations of hydrocarbon sulfonate and these compounds in an aqueous solution of hydrocarbon sulfonate substantially free of sodium chloride, or containing no more than a minimum concentration of sodium chloride of 0.5 weight percent, than if sodium chloride alone were employed to enhance the lowering of the interfacial tension.

Sodium carbonate, sodium tripolyphosphate, tetrasodium pyrophosphate, and sodium borate tend to be adsorbed from an aqueous solution thereof upon the surfaces of a subterranean formation. They will adsorb onto the surfaces of the subterranean formation preferentially to the hydrocarbon sulfonate and occupy the adsorption sites on the surfaces of the subterranean formation to the exclusion of the hydrocarbon sulfonate. Hence, the use of the sodium carbonate, sodium tripolyphosphate, tetrasodium pyrophosphate, and sodium borate reduces the adsorption of hydrocarbon sulfonate from the aqueous solution therof. However, with adsorption of the sodium carbonate, sodium tripolyphosphate, tetrasodium pyrophosphate, or sodium borate, the concentration thereof in the aqueous solution of hydrocarbon sulfonate decreases and the concentration of these compounds, selected previously to provide the minimum interfacial tension, no longer exists. Thus, and increase in interfacial tension occurs. On the other hand, employing a concentration of these compounds of at least 2 percent by weight of the aqueous solution of hydrocarbon sulfonate, and the compounds providing a low interfacial tension over a wide range of concentrations of hydrocarbon sulfonate and these compounds, adsorption of the compounds to the same extent as in the concentrations heretofore employed will have a lesser effect on the interfacial tension.

The aqueous solution of hydrocarbon sulfonate cannot contain sodium chloride in a concentration greater than 0.5 percent by weight. Preferably, the aqueous solution of hydocarbon sulfonate is entirely free of sodium chloride. With concentrations of sodium chloride greater than 0.5 percent by weight, the sodium chloride, in conjunction with the sodium carbonate, sodium tripolyphosphate tetrasodium pyrophosphate, and sodium borate, raises the interfacial tension rather than lowers it. Further, a salting out of the hydrocarbon sulfonate from the aqueous solution occurs. As a result, the effect of the hydrocarbon sulfonate on the interfacial tension between the solution and the petroleum in the formation is lost.

In the practice of the invention, the aqueous solution of hydrocarbon sulfonate may be an aqueous solution of any hydrocarbon sulfonate effective for reducing the interfacial tension between the solution thereof and the petroleum in the subterranean formation and effective for displacing the petroleum within the formation. Hydrocarbon sulfonates of this sort are well known in the art of waterflooding for recovery of petroleum from a subterranean formation. Commonly, they are mixture of sulfonated hydrocarbons having a range of molecular weights. The mixture will have an average molecular weight. The mixture can also be characterized on the basis of its median molecular weight. Further, the hydrocarbon sulfonates are usually sulfonates of alkaryl hydrocarbons. Typical hydrocarbon sulfonates are prepared by sulfonating alkyl aryl fractions synthesized in various chemical operations, including petrochemical operations, such as the alkylation of benzene with propylene tetramer. A particular type of hydrocarbon sulfonate is a petroleum sulfonate. Petroleum sulfonates are prepared by sulfonating fractions from a crude oil or refinery stream. The sulfonation reaction may be carried out employing concentrated sulfuric acid, oleum, sulfur trioxide, or chlorosulfonic acid.

The hydrocarbon sulfonates may be employed in the acid form or in the form of a salt. The acid form is corrosive. Accordingly, the hydrocarbon sulfonates ordinarily will be employed in the form of a neutral salt. This salt will usually be the sodium salt. However, they may be employed in the form of a salt other than the sodium salt.

The concentration of the hydrocarbon sulfonate in the aqueous solution injected into the subterranean formation may be those concentrations conventionally employed. For example, the concentration may be at least 0.01 and no more than 25 percent by weight.

The water employed for preparing the aqueous solution of the hydrocarbon sulfonate should be, as indicated previously, entirely free of sodium chloride. However, as also indicated previously, the aqueous solution of the hydrocarbon sulfonate may contain sodium chloride in concentrations up to 0.5 percent by weight. It is preferred, also, that the water employed for preparing the aqueous solution of hydrocarbon sulfonate be entirely free of salts having divalent cations, i.e., calcium and magnesium salts, since these are chemically incompatible with the hydrocarbon sulfonate.

The sodium carbonate, sodium tripolyphosphate, tetrasodium pyrophosphate, and sodium borate are employed in the aqueous solution of hydrocarbon sulfonate in the concentration of at least 2 percent by weight. Preferably, the concentration, of at least 2 percent by weight, should be the concentration giving the minimum interfacial tension. The range of concentrations over which a minimum interfacial tension is obtained is broader than if sodium chloride alone were used to enhance the lowering of the interfacial tension. Thus, the minimum interfacial tension may be obtained within a range of concentrations. The least concentration giving the minimum interfacial tension need not be employed. Rather, greater concentrations may be employed. With these greater concentrations, a greater amount of the hydrocarbon sulfonate may be lost from the aqueous solution by adsorption on the surfaces of the subterranean formation before the concentration becomes too low for effectively decreasing interfacial tension. The concentration to be employed can be as high as 20 percent by weight. However, ordinarily, amounts greater than 20 percent need not be employed.

The sodium carbonate, sodium tripolyphosphate, tetrasodium pyrophosphate, and the sodium borate to be employed are the compounds having the chemical formulas $Na_2CO_3$, $Na_5P_3O_{10}$, $Na_4P_2O_7$, and $Na_2B_4O_7$, respectively.

The aqueous solution of hydrocarbon sulfonate may contain each of the sodium carbonate, sodium tripolyphosphate, tetrasodium pyrophosphate, or sodium borate alone. However, the solution may contain two or more of each of the compounds. Where two or more of each of the compounds are contained in the solution, the total amount of the two or more compounds should not exceed 20 percent by weight.

Following preparation of the aqueous solution of hydrocarbon sulfonate containing the sodium carbonate, sodium tripolyphosphate, tetrasodium pyrophosphate, or sodium borate, the solution is injected into the subterranean formation through an injection well. The amount of the aqueous solution injected into the subterranean formation will be that conventionally employed. For example, the aqueous solution may be injected into the formation in the amount of 0.05 to 0.6 pore volume of the formation swept by the solution. Greater amounts may be employed but greater amounts entail greater costs and the additional petroleum recovered by such greater amounts may not be commensurate with the costs of the greater amounts of the solution.

The total amount of the solution may be injected into the formation as a single slug or as a plurality of slugs. Where the solution is injected into the formation in a plurality of slugs, a driving fluid is injected into the formation to drive the slugs through the formation toward a production well. Further, following injection of the total amount of the solution containing the hydrocarbon sulfonate, a driving fluid is injected into the formation similarly to drive the solution through the formation toward a production well. The driving fluid may be natural gas, exhaust gas, water, or other suitable driving fluid conventionally employed. Preferably, water is employed as the driving fluid.

Where the formation contains water having a concentration of sodium chloride greater than 0.5 percent by weight, a slug of water having a concentration of sodium chloride not greater than 0.5 percent by weight is preferably injected into the formation prior to the aqueous solution of hydrocarbon sulfonate. Where the formation contains clays which swell upon contact with fresh water, this slug of water should contain a sufficient concentration of sodium chloride, or of other salt compatible with hydrocarbon sulfonate, to prevent swelling of the clay. A concentration of sodium chloride of 0.5 percent by weight will ordinarily prevent swelling. Accordingly, the slug of water may contain 0.5 percent by weight of sodium chloride. By the use of this slug of water, the water in the formation is displaced from the formation by the slug of water and provides a buffer zone between the water in the formation and the aqueous solution of hydrocarbon sulfonate. This buffer zone prevents contact of the formation water and the aqueous solution and avoids deleterious effect of the water in the formation containing the sodium chloride on the aqueous solution of hydrocarbon sulfonate.

Similarly, where water is employed as the driving fluid and the water contains sodium chloride in a concentration greater than 0.5 percent by weight, there is injected behind the aqueous solution, and in front of the driving fluid, a slug of water similar to the slug of water mentioned above injected into the formation prior to the aqueous solution. This slug of water provides a buffer zone to prevent contact of the aqueous solution of hydrocarbon sulfonate with the driving fluid.

In the event the water in the formation contains salts having divalent cations, such as calcium or magnesium salts, a slug of water containing a lesser concentration, preferably free of such salts, is preferably injected into the formation prior to the aqueous solution of hydrocarbon sulfonate. Where the driving fluid is water and this water also contains salts having divalent cations, a similar slug of water is preferably injected subsequent to the aqueous solution and prior to the driving fluid.

If desired, various types of agents may be added to the aqueous solution of hydrocarbon sulfonate to impart additional properties to the solution or enhance the properties of the solution. Thus, for example, a thickening agent may be added, within limits as to amount, to the aqueous solution where viscosity is required. A preservative may be used in addition to the thickening agent where the thickening agent requires a preservative.

I claim:

1. In a process for the recovery of petroleum from a petroliferous subterranean formation wherein an aqueous solution of a hydrocarbon sulfonate is injected into said formation through at least one injection well to displace petroleum in said formation and move it in the direction of at least one production well through which said petroleum may be brought to the surface of the earth, the improvement comprising injecting into said formation said aqueous solution of hydrocarbon sulfonate containing sodium carbonate, sodium tripolyphosphate, tetrasodium pyrophosphate or sodium borate in a concentration of at least 2 percent by weight, said aqueous solution of hydrocarbon sulfonate containing no more than 0.5 percent by weight of sodium chloride.

2. The process of claim 1 wherein said aqueous solution contains said sodium carbonate, sodium tripolyphosphate, tetrasodium pyrophosphate, or sodium borate in a concentration between 2 and 20 percent by weight.

3. The process of claim 1 wherein said aqueous solution of hydrocarbon sulfonate is entirely free of sodium chloride.

4. The process of claim 1 wherein said aqueous solution of hydrocarbon sulfonate contains two or more of said sodium carbonate, sodium tripolyphosphate, tetrasodium pyrophosphate, or sodium borate.

5. The process of claim 1 wherein said aqueous solution contains sodium carbonate.

6. The process of claim 1 wherein said aqueous solution contains sodium tripolyphosphate.

7. The process of claim 1 wherein said aqueous solution contains tetrasodium pyrophosphate.

8. The process of claim 1 wherein said aqueous solution contains sodium borate.

References Cited

UNITED STATES PATENTS

| | | | |
|---|---|---|---|
| 3,180,410 | 4/1965 | Turbak | 166—275 |
| 3,191,676 | 6/1965 | Froning | 166—275 |
| 3,258,071 | 6/1966 | Shen et al. | 166—275 |
| 3,302,713 | 2/1967 | Ahearn et al. | 166—274 |
| 3,315,743 | 4/1967 | Abdo et al. | 166—275 X |
| 3,315,744 | 4/1967 | Dunlap | 166—275 X |
| 3,348,611 | 10/1967 | Reisberg | 166—275 |
| 3,369,602 | 2/1968 | Fallgatter et al. | 166—273 |
| 3,373,808 | 3/1968 | Patton | 166—275 |
| 3,437,140 | 4/1969 | Foster et al. | 166—273 |

STEPHEN J. NOVOSAD, Primary Examiner

U.S. Cl. X.R.

166—273, 274